US007805347B1

(12) United States Patent
Jones et al.

(10) Patent No.: US 7,805,347 B1
(45) Date of Patent: *Sep. 28, 2010

(54) METHODS, SYSTEMS AND SECURITIES FOR ASSURING A COMPANY AN OPPORTUNITY TO SELL STOCK AFTER A SPECIFIED TIME

(75) Inventors: Emerson P. Jones, Greenwich, CT (US); Karen Schoen, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1545 days.

This patent is subject to a terminal disclaimer.

(21) Appl. No.: 10/680,010

(22) Filed: Oct. 7, 2003

Related U.S. Application Data

(60) Provisional application No. 60/416,752, filed on Oct. 7, 2002.

(51) Int. Cl.
*G06Q 40/00* (2006.01)
(52) U.S. Cl. .......................... 705/36 R; 705/35; 705/37
(58) Field of Classification Search ............... 705/1, 705/36 T, 26, 38, 39, 14, 4, 40, 2, 27, 36 R, 705/35, 37; 235/380
See application file for complete search history.

(56) References Cited

U.S. PATENT DOCUMENTS

| | | | |
|---|---|---|---|
| 5,704,045 A | 12/1997 | King et al. | |
| 5,742,775 A | 4/1998 | King | |
| 5,761,441 A | 6/1998 | Bennett | |
| 5,970,479 A | 10/1999 | Shepherd | |
| 6,112,188 A | 8/2000 | Hartnett | |
| 6,134,536 A | 10/2000 | Shepherd | |
| 6,148,293 A | 11/2000 | King | |
| 6,263,321 B1 * | 7/2001 | Daughtery, III | 705/36 R |
| 6,278,981 B1 | 8/2001 | Dembo et al. | |
| 6,321,212 B1 | 11/2001 | Lange | |
| 6,381,585 B1 | 4/2002 | Maples et al. | |
| 6,418,419 B1 | 7/2002 | Nieboer et al. | |
| 6,484,152 B1 | 11/2002 | Robinson | |
| 7,236,955 B2 * | 6/2007 | Sugahara | 705/37 |
| 2001/0037277 A1 | 11/2001 | Willis et al. | |
| 2001/0049651 A1 | 12/2001 | Selleck | |
| 2001/0056392 A1 | 12/2001 | Daughtery, III | |
| 2002/0042770 A1 | 4/2002 | Slyke et al. | |
| 2002/0052819 A1 | 5/2002 | Burton | |
| 2002/0099640 A1 | 7/2002 | Lange | |
| 2002/0103852 A1 * | 8/2002 | Pushka | 705/35 |
| 2002/0147670 A1 | 10/2002 | Lange | |
| 2002/0156719 A1 | 10/2002 | Finebaum et al. | |
| 2003/0009406 A1 | 1/2003 | Ross | |
| 2003/0028468 A1 | 2/2003 | Wong et al. | |
| 2003/0093375 A1 | 5/2003 | Green et al. | |
| 2003/0115128 A1 | 6/2003 | Lange et al. | |
| 2003/0126069 A1 | 7/2003 | Cha | |
| 2003/0130941 A1 * | 7/2003 | Birle et al. | 705/40 |
| 2003/0135436 A1 | 7/2003 | Birle, Jr. et al. | |
| 2003/0135446 A1 | 7/2003 | Birle, Jr. et al. | |
| 2003/0163400 A1 | 8/2003 | Ross et al. | |
| 2003/0225656 A1 * | 12/2003 | Aberman et al. | 705/36 |
| 2003/0236738 A1 | 12/2003 | Lange et al. | |
| 2004/0006520 A1 | 1/2004 | Birle, Jr. et al. | |
| 2004/0039669 A1 * | 2/2004 | Jones et al. | 705/35 |
| 2004/0133494 A1 * | 7/2004 | Jones et al. | 705/35 |
| 2005/0119962 A1 * | 6/2005 | Bowen et al. | 705/37 |
| 2006/0218069 A1 * | 9/2006 | Aberman et al. | 705/37 |

OTHER PUBLICATIONS

Anonymous "Business Briefs Pacific Northwest" Seattle Times, Mar. 29, 2001, p. C1.*
Rubinger, Jeffrey, L. "IRS Starting to Callenge Popular Tax Deferral Technique (Variable Prepaid Forward Contracts)" Florida Bar Journal, Jan. 1, 2003.*
"LaBranche & Co. Announces Shelf Registration of Shares", PR Newswire. New York: Jan. 18, 2002: p. 1.
"Starbucks stock helps Schultz buy Sonics", Seattle Times, Wash: Mar. 29, 2001. p. 1.
"Mandatory Convertible", Investopedia.com, http://www.invetopedia.com/terms/m/mandatoryconvertible.asp.
"Gabelli to Sell Mandatory Convertible Securities", Gabelli Asset Management Inc., Jan. 29, 2002.
"AMG Mandatory Convertible Securities Sale Yields $223 Million in Net Proceeds", AMG News, Jan. 10, 2002.
"MONIS Convertibles Training", Comment of the Week, Aug. 2, 2002.
"A.M/ Best Assigns Senior Debt Ratings to St. Paul's Equity Units", BusinessWire, http://www.findarticles.com/cf_dls/m0EIN/2002_July_31/89933924/print.jhtml.

* cited by examiner

*Primary Examiner*—Kelly Campen
(74) *Attorney, Agent, or Firm*—Chadbourne & Parke LLP; Walter G. Hanchuk

(57) ABSTRACT

Methods, systems and securities for assuring a company an opportunity to sell stock (e.g., common stock) after a specified time are disclosed. In one embodiment, a sale, by a company to an other entity, of a security may be issued, consisting of: (i) a post-paid forward contract which obligates the other entity to purchase a fixed number of shares stock of the company; and (ii) debt. In one embodiment, a purchase, by the company from the other entity, of a paid forward contract may be issued, which obligates the other entity to deliver to the company a variable number of shares of stock in the company. The number of shares underlying the pre-paid forward contract may be calculated based on a formula that is a function of a then-current stock price and a remaining maturity associated with the pre-paid forward contract.

19 Claims, No Drawings

METHODS, SYSTEMS AND SECURITIES FOR ASSURING A COMPANY AN OPPORTUNITY TO SELL STOCK AFTER A SPECIFIED TIME

CROSS-REFERENCE TO RELATED APPLICATIONS

This application claims the benefit under 35 U.S.C. 119(e) of U.S. Provisional Application Ser. No. 60/416,752, filed Oct. 7, 2002.

FIELD OF THE INVENTION

Various embodiments of the present invention relate to methods, systems and securities for assuring a company an opportunity to sell stock (e.g., common stock) after a specified time.

More particularly, in one embodiment a method implemented by a programmed computer system for use in connection with the sale of stock by a first entity is provided, which method comprises the steps of: inputting data regarding the sale, by the first entity to a second entity, of a security consisting of: (i) a post-paid forward contract which obligates the second entity to purchase a fixed number of shares stock of the first entity; and (ii) debt; inputting data regarding the purchase, by the first entity from the second entity, of a pre-paid forward contract which obligates the second entity to deliver to the first entity a variable number of shares of stock in the first entity; inputting a then-current stock price associated with the stock of the first entity; calculating a number of shares underlying the pre-paid forward contract, based on a formula that is a function of a then-current stock price and a remaining maturity associated with the pre-paid forward contract; recording the data regarding the sale, by the first entity to the second entity, of the security consisting of: (i) the post-paid forward contract; and (ii) the debt; recording the data regarding the purchase, by the first entity from the second entity, of the pre-paid forward contract; and recording the calculated number of shares underlying the pre-paid forward contract; wherein the pre-paid forward contract comprises a call option.

In another embodiment a security is provided, comprising: (a) a post-paid forward contract between a first entity and a second entity, which post-paid forward contract obligates the second entity to purchase a fixed number of shares, stock of the first entity; (b) debt of the first entity; and (c) a pre-paid forward contract between the first entity and the second entity, which pre-paid forward contract obligates the second entity to deliver to the first entity a variable number of shares of stock in the first entity; wherein the pre-paid forward contract comprises a call option.

For the purposes of the present application the term "entity" is intended to refer to any person, organization, or group.

Further, for the purposes of the present application the term "security" is intended to refer to an instrument evidencing debt and/or ownership of asset(s).

Further still, for the purposes of the present application the term "delivery" is intended to refer to physical delivery of an instrument evidencing debt and/or ownership of asset(s) and/or delivery of equivalent value.

BACKGROUND OF THE INVENTION

Advances in markets and securities have led to the widespread availability of a number of different type of financial products. Many investors and institutions hold common stock. The buying and selling of stock in stock markets has made it easy for investors to invest and diversify their financial portfolios.

BRIEF SUMMARY OF THE INVENTION

Aspects of the methods, systems and securities describes herein a sale, by a company to an other entity, of a security that may be issued, consisting of: (i) a post-paid forward contract which obligates the other entity to purchase a fixed number of shares stock of the company; and (ii) debt. Aspects of the methods, systems and securities further describes herein a purchase, by the company from the other entity, of a pre-paid forward contract may be issued, which obligates the other entity to deliver to the company a variable number of shares of stock in the company. The number of shares underlying the pre-paid forward contract may be calculated based on a formula that is a function of a then-current stock price and a remaining maturity associated with the pre-paid forward contract.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment a method implemented by a programmed computer system for use in connection with the sale of stock by a first entity is provided, which method comprises the steps of: inputting data regarding the sale, by the first entity to a second entity, of a security consisting of: (i) a post-paid forward contract which obligates the second entity to purchase a fixed number of shares stock of the first entity; and (ii) debt; inputting data regarding the purchase, by the first entity from the second entity, of a pre-paid forward contract which obligates the second entity to deliver to the first entity a variable number of shares of stock in the first entity; inputting a then-current stock price associated with the stock of the first entity; calculating a number of shares underlying the pre-paid forward contract, based on a formula that is a function of a then-current stock price and a remaining maturity associated with the pre-paid forward contract; recording the data regarding the sale, by the first entity to the second entity, of the security consisting of: (i) the post-paid forward contract; and (ii) the debt; recording the data regarding the purchase, by the first entity from the second entity, of the pre-paid forward contract; and recording the calculated number of shares underlying the pre-paid forward contract; wherein the pre-paid forward contract comprises a call option.

In another embodiment a security is provided, comprising: (a) a post-paid forward contract between a first entity and a second entity, which post-paid forward contract obligates the second entity to purchase a fixed number of shares stock of the first entity; (b) debt of the first entity; and (c) a pre-paid forward contract between the first entity and the second entity, which pre-paid forward contract obligates the second entity to deliver to the first entity a variable number of shares of stock in the first entity; wherein the pre-paid forward contract comprises a call option.

In one example, the stock of the first entity may be common stock in a public company.

In another example, the post-paid forward contract may obligate the first entity to sell and the second entity to purchase, at maturity of the post-paid forward contract, a fixed number of shares of stock in the first entity for a fixed price.

In another example, the fixed price may essentially equal a face amount of the debt.

In another example, the first entity may pay, to the second entity, a contract fee on the post-paid forward contract.

In another example, the contract fee may be paid once.

In another example, the contract fee may be paid periodically at a time selected from the group including (but not limited to): (a) daily; (b) weekly; (c) monthly; (d) quarterly; (e) semi-annually; and (f) annually.

In another example, the debt may be initially pledged as collateral to secure the obligations of the second entity under the post-paid forward contract.

In another example, the second entity may have the right to recollateralize the post-paid forward contract.

In another example, the debt may pay a fixed cash coupon, subject to reset.

In another example, the coupon may be paid periodically at a time selected from the group including (but not limited to): (a) daily; (b) weekly; (c) monthly; (d) quarterly; (e) semi-annually; and (f) annually.

In another example, the coupon may be reset and the debt may be remarketed.

In another example, the pre-paid forward contract may obligate the second entity to deliver to the first entity a variable number of shares of stock in the first entity depending on a price of the stock at maturity of the pre-paid forward contract.

In another example, the first entity may pre-pay the purchase price of the stock and may need not pay for the stock at the time of delivery.

In another example, at least a portion of the purchase price of the stock may be paid to the second entity at the time of issuance of the pre-paid forward contract with the remaining portion funded through periodic contract payments.

In another example, the contract payments may be paid periodically at a time selected from the group including (but not limited to): (a) daily; (b) weekly; (c) monthly; (d) quarterly; (e) semi-annually; and (f) annually.

In another example, prior to maturity of the pre-paid forward contract, the first entity may have the right to fix the number of shares underlying the pre-paid forward contract, based on a formula that is a function of a then-current stock price and a remaining maturity associated with the pre-paid forward contract.

In another example, the post-paid forward contract and the debt may be initially pledged as collateral to secure the obligations of the second entity to deliver stock pursuant to the pre-paid forward contract.

In another example, the second entity may have the right to recollateralize the pre-paid forward contract with common stock of the first entity.

An overview of one embodiment of the present invention will now be described. Of note, this embodiment of the present invention may hereinafter sometimes be referred to as a PACES structure (or security). In any case, such a PACES structure may have the following characteristics (the specific dates, time periods, interest rates and the like are, of course, provided simply as examples which are intended to be illustrative and not restrictive):

Summary Description
Security which assures Company opportunity to sell stock (e.g., common stock) at the end of a certain time period (e.g., three years)
Company sells PACES security consisting of: (i) a 3-year (or, in another example, 5-year) post-paid forward contract to purchase a fixed number of shares of Company common stock (the "Fixed-Share Forward Contract"); and (ii) 5-year (or, in another example, 7-year) debt (the "Resettable Remarketable Debt" or the "Debt") to investors Fixed-Share Forward Contract
Maturity is 3 years (or, in another example, 5 years)
Obligates Company to sell and investor(s) to purchase at maturity a fixed number of shares of Company common stock for a fixed price
Purchase price may equal face amount of Debt
Depending on terms, Company may pay contract fees (e.g., quarterly) to investor(s) on the Fixed-Share Forward Contract
Debt may initially be pledged as collateral to secure investors' obligations under the Fixed-Share Forward Contract
Investor(s) may have the right to recollateralize the Fixed-Share Forward Contract with Treasury Securities Resettable Remarketable Debt
Maturity is five years (or, in another example, could be seven years if the Fixed-Share Forward is structured to have maturity of 5 years)
Debt may pay a cash coupon (e.g., fixed, quarterly) subject to reset at end of 2¼ years (or, in another example, 4¾ years)
After 2¾ years (or, in another example, 4¾ years), interest rate may be reset and Debt may be remarketed to new investor(s) for at least a certain percentage (e.g. 100.5%) of purchase price of portfolio of Treasury Securities which defeases the purchase price under the Fixed-Share Forward and the remaining payment (e.g., quarterly payment) on the Debt through the maturity of the Fixed-Share Forward Contract (assuming the interest rate on the Debt is not reset)

Treasury/Agency Collateralized PACES
Variation in which PACES security consists of Treasury Securities (or, in another example, US Government Agency Securities) in lieu of Resettable Remarketable Debt
Treasury Securities (or Agency Securities) may have a face amount at maturity of the Fixed-Share Forward Contract equal to the Fixed-Share Forward Contract purchase price
Holders of PACES may receive yield on Treasury Securities (or Agency Securities), in addition to Contract Fees, if any, that Company pays on Fixed-Share Forward Referring now to a specific example of the present invention, a PACES structure may have the following characteristics (the specific dates, time periods, interest rates and the like are, of course, provided simply as examples which are intended to be illustrative and not restrictive):

Issuer: Any desired entity (the "Company")
Securities
Company issues PACES security initially consisting of: a 3-year (or, in another example, 5-year) post-paid forward contract to purchase a fixed number of shares (e.g., 1.000 shares) of Company common stock for cash (the "Fixed-Share Forward Contract"); and 5-year (or, in another example, 7-year) debt (the "Resettable Remarketable Debt" or "Debt"). The Debt may initially be pledged as collateral to secure investors' purchase obligations under the Fixed-Share Forward Contract. (Alternatively, in lieu of Resettable Remarketable Debt, PACES security may contain Treasury Securities and/or US Government Agency Securities (see "Treasury/Agency-Collateralized PACES" below).)

Issue Price: Any desired amount (e.g., $25 per PACES when Company stock price=$25 [of note, the two values do not necessarily have to be equal]).

Fixed-Share Forward Contract

Irrevocable contract between Company and investor(s) specifying the future sale by Company of a fixed number of shares of its common stock (e.g., 1.000 shares) in exchange for a fixed dollar amount (the "Fixed-Share Forward Contract Price") in 3 years (or, in another example, 5 years). The Fixed-Share Forward Contract Price may equal the principal amount of the Debt and may be payable only in cash (i.e., investor(s) may be required to use cash to settle the Fixed-Share Forward Contract).

Investor(s) may settle the Fixed-Share Forward prior to maturity.

The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.

Contract Fees on Fixed-Share Forward: Company may pay contract fees (e.g., quarterly) on the Fixed-Share Forward Contract at any desired annual rate (Depending on the terms of particular PACES issuance, Company may not be required to pay contract fees on the Fixed-Share Forward Contract).

Resettable Remarketable Debt

The Resettable Remarketable Debt may be issued by Company with any desired principal amount (e.g., $25) and may have a maturity of 5 years (or, in another example, 7 years). Company may make interest payments (e.g., on a quarterly basis) at any desired annual rate on the principal amount. After year 2¾ (or, in another example, year 4¾), the interest rate on the Debt may be reset and the Debt may be remarketed (see "Mechanics of Reset and Remarketing" below).

In the event of a failed remarketing, the Debt may be puttable by investor(s) at face value.

Mechanics of Reset and Remarketing: At year 2¾ (or, in another example, year 4¾), each holder of the Debt (whether the Debt is held separately or as part of the PACES security) may determine whether it intends to participate in the remarketing. If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the interest payment (e.g., quarterly interest payment) on the Debt such holder(s) would otherwise be entitled to if the Debt were not reset and remarketed; and (iii) any accrued and unpaid interest on the Debt. Holder(s) who elect not to participate in the remarketing may be required to deliver specified U.S. Treasury Securities to the Forward Contract Agent on the designated date prior to the remarketing.

Transferability of the Debt: Subject to the requirement to post substitute collateral (see "Substitution of Pledged Securities" below), the Debt may be freely transferable.

Substitution of Pledged Securities: The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal the principal amount of the Debt. Upon the substitution of such collateral, the Debt may be released to the holder, creating "Stripped PACES."

Listing of Stripped Units: If Stripped PACES and Debt are separately traded to a sufficient extent that applicable exchange listing requirements are met, Company may endeavor to cause such securities to be listed on the exchange on which the PACES are then listed.

Recreating PACES: Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.

Bankruptcy or Default:

In case of bankruptcy prior to maturity, the Fixed-Share Forward Contract may automatically terminate. If, in the event of a failed remarketing, investor(s) exercise the put right on the Debt but Company fails to satisfy its obligations under that put, the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.

Treasury/Agency-Collateralized PACES

In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.

Holder(s) of PACES may receive the yield on the Treasury Securities (or US Government Agency Securities) in addition to contract fees, if any, that Company pays on the Fixed-Share Forward Contract.

An overview of another embodiment of the present invention will now be described. Of note, this embodiment of the present invention may hereinafter sometimes be referred to as a PLACES structure (or security). In any case, such a PLACES structure may have the following characteristics (the specific dates, time periods, interest rates and the like are, of course, provided simply as examples which are intended to be illustrative and not restrictive):

Summary Description

Security which assures Company opportunity to sell stock (e.g., common stock) at the end of a certain time period (e.g., three years)

At inception, Company does the following (may be essentially simultaneously):

Sells PACES consisting of (i) a 2¾-year (or, in another example, 4¾-year) post-paid forward contract to purchase a fixed number of shares of Company common stock (the "Fixed-Share Forward Contract") and (ii) 5-year (or, in another example 7-year) debt (the "Resettable Remarketable Debt" or the "Debt") to investor(s)

Purchases from the same investor(s) a 3-year (or, in another example, 5-year) pre-paid forward contract to acquire a variable number of shares of Company common stock (the "Variable-Share Forward Contract")

Fixed-Share Forward Contract

Maturity is 2¾ years (or, in another example, 4¾ years)

Obligates Company to sell and investor(s) to purchase at maturity a fixed number of shares of Company common stock for a fixed price Purchase price may equal face amount of Debt Depending on terms, Company may pay contract fees (e.g., quarterly) to investor(s) on the Fixed-Share Forward Contract Debt may initially be pledged as collateral to secure investors' obligations under the Fixed-Share Forward Contract Investor(s) may have the right to recollateralize Fixed-Share Forward Contract with Treasury Securities Resettable Remarketable Debt Maturity is five years (in another example, could be seven years (e.g., if the Fixed-Share Forward is structured to have maturity of 4¾ years))

Debt may pay fixed (and/or floating) coupon (e.g., quarterly cash coupon), subject to reset at end of 2½ years (or, in another example, 4½ years)

After 2½ years (or, in another example, 4½ years), interest rate may be reset and Debt may be remarketed to new investor(s) for at least a certain percentage (e.g., 100.5%) of purchase price of portfolio of Treasury Securities which defeases the purchase price under the Fixed-Share Forward and the remaining payment (e.g., quarterly) on the Debt through the maturity of the Fixed-Share Forward Contract (assuming the interest rate on the Debt is not reset)

Variable-Share Forward Contract

Maturity is three years (or, in another example, five years)

Obligates investor(s) to deliver to Company a variable number of shares depending on stock price at maturity Company may pre-pay purchase price and may need not pay for such stock at time of delivery Portion of purchase price may be paid to investor(s) at time of PLACES issuance; remaining portion may be funded through contract payments (e.g., quarterly)

Prior to maturity, Company may have the right to fix the number of shares underlying the Variable-Share Forward Contract, based on a pre-specified formula that is a function of then-current stock price and remaining maturity All or some of the PACES may initially be pledged as collateral to secure investors' obligations to deliver stock pursuant to the Variable-Share Forward Investor(s) may have right to recollateralize Variable-Share Forward with Company common stock Treasury/Agency Collateralized PLACES Variation on PLACES in which PACES consist of Treasury Securities (or, in another example, US Government Agency Securities) in lieu of Resettable Remarketable Debt Treasury Securities (or Agency Securities) may have a face amount at maturity of Fixed-Share Forward Contract equal to Fixed-Share Forward Contract purchase price Holder(s) of PACES may receive yield on Treasury Securities (or Agency Securities) in addition to contract payments, if any, that Company makes on Fixed-Share Forward Referring now to a specific example of the present invention, a PLACES structure may have the following characteristics (the specific dates, time periods, interest rates and the like are, of course, provided simply as examples which are intended to be illustrative and not restrictive):

Issuer: Any desired entity (the "Company")

Securities

The issuance of PLACES contemplates:

(a) The sale to investor(s) of PACES initially consisting of:

(i) a 2¾-year (or, in another example, 4¾-year) post-paid forward contract to purchase a fixed number of shares (e.g., 1.000 share) of Company common stock for cash (the "Fixed-Share Forward Contract"); and (ii) 5-year (or, in another example, 7-year) debt (the "Resettable Remarketable Debt" or "Debt"). The Debt may initially be pledged as collateral to secure investors' purchase obligations under the Fixed-Share Forward Contract. (Alternatively, in lieu of Resettable Remarketable Debt, PACES may contain Treasury Securities or US Government Agency Securities (see "Treasury/Agency-Collateralized PLACES" below).)

(b) The purchase by Company from the same investor(s) of a 3-year (or, in another example, 5-year) pre-paid forward contract to acquire a variable number of shares of Company common stock (the "Variable-Share Forward Contract"). Company may pay a portion of the purchase price upfront; the remainder may be paid to investor(s) through contract fees (e.g., quarterly). All or some of the PACES may initially be pledged as collateral to secure investors' obligations to deliver common stock to Company under the Variable-Share Forward Contract Issue Price: Any desired amount (e.g., $25 per PLACES when Company stock price=$25) [of note, the PLACES price and the Company Stock do not necessarily have to be equal]). The PLACES issue price may be the issue price of the PACES (a certain amount for the Fixed-Share Forward Contract plus a certain amount for the Debt), less an upfront price paid by Company for the Variable-Share Forward Contract.

Fixed-Share Forward Contract

Irrevocable contract between Company and investor(s) specifying the future sale by Company of a fixed number of shares (e.g., 1.000 share) of its common stock in exchange for a fixed dollar amount (the "Fixed-Share Forward Contract Price") in 2¾ years (or, in another example, 4¾ years). The Fixed-Share Forward Contract Price may equal the principal amount of the Debt and may be payable only in cash (i.e., investor(s) may need to use cash to settle the Fixed-Share Forward Contract).

Subject to the requirement to post substitute collateral for the Variable-Share Forward Contract, investor(s) may settle the Fixed-Share Forward prior to maturity.

The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the Fixed-Share Forward Contract may automatically terminate or the maturity of the Fixed-Share Forward Contract may be extended to the Extension Date, which (in one example) may be six days after the original maturity date. Investor(s) may elect to settle the Fixed-Share Forward Contract with cash prior to the Extension Date. If investor(s) have not settled the Fixed-Share Forward Contract prior to the Extension Date, the Fixed-Share Forward Contract may automatically terminate.

Contract Fees on Fixed-Share Forward: Company may pay contract fees (e.g., quarterly) on the Fixed-Share Forward Contract at any desired annual rate. (Depending on terms of particular PLACES issuance, Company may not be required to pay contract fees on the Fixed-Share Forward Contract).

Resettable Remarketable Debt

The Resettable Remarketable Debt may be issued by Company with any desired principal amount (e.g., $25) and may have a maturity of 5 years (or, in another example, 7 years). Company may make interest payments (e.g., on a quarterly basis) at any desired annual rate on the principal amount. After year 2½ (or, in another example, year 4½), the interest rate on the Debt may be reset and the Debt may be remarketed (see "Mechanics of Reset and Remarketing" below).

In the event of a failed remarketing, the Debt may be puttable by investor(s) at face value.

Mechanics of Reset and Remarketing: At year 2½ (or, in another example, year 4½), each holder of the Debt (whether the Debt is held separately or as part of the PACES) may determine whether it intends to participate in the remarketing. If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the interest payment (e.g., quarterly) on the Debt such holder(s) would otherwise be entitled to if the Debt were not reset and remarketed; and (iii) any accrued and unpaid interest on the Debt.

Holder(s) who elect not to participate in the remarketing may be required to deliver specified U.S. Treasury Securities to the Forward Contract Agent on the designated date prior to the remarketing.

Transferability of the Debt: Subject to the requirement to post substitute collateral (see "Substitution of Pledged Securities" below), the Debt may be freely transferable.

Variable-Share Forward Contract

Pre-paid and irrevocable contract between Company and investor(s) specifying the future receipt by Company of a variable number of shares of its common stock in 3 years (or, in another example, 5 years). The number of shares deliverable by investor(s) to Company (the "Settlement Rate") may be determined, for example, by the average trading price of the common stock over a 20-day period ending on the third date prior to the maturity date as summarized in Table 1, below:

TABLE 1

| Stock Price | # of Shares |
| --- | --- |
| Stock Price ≦ $35 (for example) | 0 shares |
| Stock Price > $35 (for example) | # of shares given by formula: 1 − ($35/Stock Price) |

Prior to maturity, Company may, at its option, fix the Settlement Rate based on a pre-specified formula that is a function of: (i) the average trading price of the common stock over the 20-day period ending on the third date prior to the Company's election; and (ii) the Variable-Share Forward Contract's remaining maturity.

The Variable-Share Forward Contract may automatically terminate in the event of Company bankruptcy or if, in the event of a failed remarketing, Company fails to pay put proceeds to investor(s) who exercise their put rights on the Resettable Remarketable Debt (see below).

Contract Fees on Variable-Share Forward: Company may pay contract fees (e.g., quarterly) on the Variable-Share Forward Contract at any desired annual rate.

Substitution of Pledged Securities

The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal the principal amount of the Debt. Upon the substitution of such collateral, the Debt may be released to the holder, creating "Stripped PACES."

All or some of the PACES may initially be pledged as collateral to secure investors' obligations to deliver stock under the Variable-Share Forward Contract. Upon settlement of the Fixed-Share Forward Contract at year 2¾ (or, in another example, year 4¾), the common stock issued with respect to the PACES pledged as collateral may be retained by the collateral agent to secure investors' obligations to deliver stock to Company at year 3 (or, in another example, year 5). However, each holder may have the right to substitute for the PACES (or Stripped PACES) held by the collateral agent the same number of shares of Company common stock. Upon the substitution of such collateral, the PACES (or Stripped PACES) may be released to the holder, creating "Stripped Forwards."

Listing of Stripped PACES and Stripped Forwards: If PACES, Stripped PACES, Debt, or Stripped Forwards are separately traded to a sufficient extent that applicable exchange listing requirements are met, Company may endeavor to cause such securities to be listed on the exchange on which the PLACES are then listed.

Recreating PACES and the Variable-Share Forward

Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.

A holder of Stripped Forwards may have the right to subsequently recreate Variable-Share Forward Contracts by delivering Stripped Forwards and the requisite amount of PACES in exchange for Variable-Share Forwards and the release of the common stock previously pledged as collateral.

Bankruptcy or Default: In case of bankruptcy prior to maturity, both the Fixed-Share Forward Contract and the Variable-Share Forward Contract may automatically terminate. If, in the event of a failed remarketing, investor(s) exercise the put right on the Debt but Company fails to satisfy its obligations under that put, both the Fixed-Share Forward Contract and the Variable-Share Forward Contract may automatically terminate. Alternatively, the Variable-Share Forward Contract may automatically terminate and the maturity of the Fixed-Share Forward Contract may be extended to the Extension Date, which (in one example) may be six days after the original maturity date. Investors may elect to settle the Fixed-Share Forward Contract prior to the Extension Date. If investors have not settled the Fixed-Share Forward Contract prior to the Extension Date, the Fixed-Share Forward Contract may automatically terminate.

Treasury/Agency-Collateralized PLACES

In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.

Holder(s) of PACES may receive the yield on the Treasury Securities (or US Government Agency Securities) in addition to contract fees, if any, that Company pays on the Fixed-Share Forward Contract.

An overview of another embodiment of the present invention will now be described. Of note, this embodiment of the present invention may hereinafter sometimes be referred to as a COMMON PLACES structure (or security). In any case, such a COMMON PLACES structure may have the following characteristics (the specific dates, time periods, interest rates and the like are, of course, provided simply as examples which are intended to be illustrative and not restrictive):

Summary Description

Company does the following (may be carried out essentially simultaneously):

Sells common stock to investor(s)

Purchases from the same investor(s) a 3-year (or, in another example, 5-year) pre-paid forward contract to acquire a variable number of shares of Company common stock (the "Variable-Share Forward Contract")

The two instruments above may be sold as a unit

Variable-Share Forward Contract

Maturity is three years (or, in another example, five years)

Obligates investor(s) to deliver to Company a variable number of shares depending on stock price at maturity Company may pre-pay purchase price and may need not pay for such stock at time of delivery Purchase price may be funded through contract payments (e.g., quarterly) by Company Prior to maturity, Company may have the right to fix the number of shares underlying the Variable-Share Forward Contract (e.g., based on a pre-specified formula that is a function of then-current stock price and remaining maturity)

Units (and/or separate common stock) may initially be pledged as collateral to secure investors' obligations to deliver stock pursuant to the Variable-Share Forward Investor(s) may have right to recollateralize Variable-Share Forward with Company common stock Referring now to a specific example of the present invention, a COMMON PLACES structure may have the following characteristics (the specific dates, time periods, interest rates and the like are, of course, provided simply as examples which are intended to be illustrative and not restrictive):

Issuer: Any desired entity (the "Company")

Securities

The issuance of COMMON PLACES contemplates:

(a) The sale to investor(s) of share(s) of common stock (e.g. 1 share); and (b) The purchase by Company from the same investor(s) of a 3-year (or, in another example, 5-year) pre-paid forward contract to acquire a variable number of shares of Company common stock (the "Variable-Share Forward Contract"). Company may pay the purchase price to investor(s) through contract fees (e.g., quarterly). A specified amount of common stock may be pledged as collateral to secure investors' obligations to deliver common stock to Company under the Variable-Share Forward Contract.

Issue Price: Any desired amount (e.g., $25 per COMMON PLACES when Company stock price=$25 [of note, the two values do not necessarily have to be equal]).

Variable-Share Forward Contract:

Pre-paid and irrevocable contract between Company and investor(s) specifying the future receipt by Company of a variable number of shares of its common stock in 3 years (or, in another example, 5 years). The number of shares deliverable by investor(s) to Company (the "Settlement Rate") may be determined, for example, by the average trading price of the common stock over a 20-day period ending on the third date prior to the maturity date as summarized in Table 2, below:

TABLE 2

| Stock Price | # of Shares |
| --- | --- |
| Stock Price ≦ $35 (for example) | 0 shares |
| Stock Price > $35 (for example) | # of shares given by formula: 1 − ($35/Stock Price) |

Prior to maturity, Company may, at its option, fix the Settlement Rate based on a pre-specified formula (e.g., which formula is a function of the average trading price of the common stock over the 20-day period ending on the third date prior to the Company's election and the Variable-Share Forward Contract's remaining maturity)

The Variable-Share Forward Contract may automatically terminate in the event of Company bankruptcy.

Contract Fees on Variable-Share Forward: Company may pay contract fees (e.g., quarterly) on the Variable-Share Forward Contract at any desired annual rate.

Bankruptcy or Default: In case of bankruptcy prior to maturity, the Variable-Share Forward Contract may automatically terminate.

An overview of another PLACES-type embodiment of the present invention will now be described. Such a PLACES structure may have the following characteristics (the specific dates, time periods, interest rates and the like are, of course, provided simply as examples which are intended to be illustrative and not restrictive):

Summary Description

Security which assures Company opportunity to sell stock (e.g., common stock) at the end of a certain time period (e.g., three years)

At inception, Company does the following (may be essentially simultaneously):

Sells PACES consisting of: (i) a 2¾-year (see note 1, below) post-paid forward contract to purchase a fixed number of shares of Company common stock (the "Fixed-Share Forward Contract") and (ii) 5-year (see note 1, below) debt (the "Resettable Remarketable Debt" or the "Debt") to investor(s)

Purchases from the same investor(s) a 3-year (see note 1, below) pre-paid forward contract to acquire a variable number of shares of Company common stock (the "Variable-Share Forward Contract")

Fixed-Share Forward Contract

Maturity is 2¾ years (see note 1, below)

Obligates Company to sell and investor(s) to purchase at maturity a fixed number of shares of Company common stock for a fixed price Purchase price may equal face amount of Debt Depending on terms, Company may pay contract fees (e.g., quarterly) to investor(s) on the Fixed-Share Forward Contract Debt may initially be pledged as collateral to secure investors' obligations under the Fixed-Share Forward Contract Investor(s) may have the right to recollateralize Fixed-Share Forward Contract with Treasury Securities Variable-Share Forward Contract Maturity is three years (see note 1, below)

Obligates investor(s) to deliver to Company a variable number of shares depending on stock price at maturity Company may pre-pay purchase price and may need not pay for such stock at time of delivery Portion of purchase price may be paid to investor(s) at time of PLACES issuance; remaining portion may be funded through contract payments (e.g., quarterly)

Prior to maturity, Company may have the right to fix the number of shares underlying the Variable-Share Forward Contract, based on a pre-specified formula that is a function of then-current stock price and remaining maturity Specified amount of PACES may be initially pledged as collateral to secure investors' obligations to deliver stock pursuant to the Variable-Share Forward Investor(s) may have right to recollateralize Variable-Share Forward with Company common stock (number of shares which must be pledged may equal maximum number of shares deliverable under that contract)

Resettable Remarketable Debt

Maturity is five years (see note 1, below)

Debt may pay fixed (see note 2, below) coupon (e.g., quarterly cash coupon), subject to reset at end of 2½ years (see note 3, below)

After 2½ years (see note 3, below), interest rate may be reset and Debt may be remarketed to new investor(s) for at least a certain percentage (e.g., 100.5%) of purchase price of portfolio of Treasury Securities which defeases the purchase price under the Fixed-Share Forward and the remaining payment (e.g., quarterly) on the Debt through the maturity of the Fixed-Share Forward Contract (assuming the interest rate on the Debt is not reset)

Treasury/Agency Collateralized PLACES

Variation on PLACES in which PACES consist of Treasury Securities (or, in another example, US Government Agency Securities) in lieu of Resettable Remarketable Debt Treasury Securities (or Agency Securities) may have a face amount at maturity of Fixed-Share Forward Contract equal to Fixed-Share Forward Contract purchase price Holder(s) of PACES may receive yield on Treasury Securities (or Agency Securities) in addition to contract payments, if any, that Company makes on Fixed-Share Forward Referring now to a specific example of the present invention, a PLACES structure may have the following characteristics (the specific dates, time periods, interest rates and the like are, of course, provided simply as examples which are intended to be illustrative and not restrictive):

Issuer: Any desired entity (the "Company")

Securities

The issuance of PLACES contemplates:

(a) The sale to investor(s) of PACES initially consisting of:

a 2¾-year (see note 1, below) post-paid forward contract to purchase a fixed number of shares (e.g., 1.000 share) of Company common stock for cash (the "Fixed-Share Forward Contract"); and 5-year (see note 1, below) debt (the "Resettable Remarketable Debt" or "Debt"). The Debt may initially be pledged as collateral to secure investors' purchase obligations under the Fixed-Share Forward Contract. (Alternatively, in lieu of Resettable Remarketable Debt, PACES may contain Treasury Securities or US Government Agency Securities (see "Treasury/Agency-Collateralized PLACES" below).)

(b) The purchase by Company from the same investor(s) of a 3-year (see note 1, below) pre-paid forward contract to acquire a variable number of shares of Company common stock (the "Variable-Share Forward Contract"). Company may pay a portion of the purchase price upfront; the remainder may be paid to investor(s) through contract fees (e.g., quarterly). A specified portion of the PACES may initially be pledged as collateral to secure investors' obligations to deliver common stock to Company under the Variable-Share Forward Contract Issue Price: Any desired amount (e.g., $25 per PLACES when Company stock price=$25="Reference Price" [of note, the PLACES price and the Company Stock Price/Reference Price do not necessarily have to be equal]). The PLACES issue price may be the issue price of the PACES (a certain amount for the Fixed-Share Forward Contract plus a certain amount for the Debt), less an upfront price paid by Company for the Variable-Share Forward Contract.

Fixed-Share Forward Contract
- Irrevocable contract between Company and investor(s) specifying the future sale by Company of a fixed number of shares (e.g., 1.000 share (see note 4, below)) of its common stock in exchange for a fixed dollar amount (the "Fixed-Share Forward Contract Price") in 2¾ years (see note 1, below). The Fixed-Share Forward Contract Price may equal the principal amount of the Debt and may be payable only in cash (i.e., investor(s) may need to use cash to settle the Fixed-Share Forward Contract).
- Subject to the requirement to post substitute collateral for the Variable-Share Forward Contract, investor(s) may settle the Fixed-Share Forward prior to maturity.
- The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.
- Contract Fees on Fixed-Share Forward: Company may pay contract fees (e.g., quarterly) on the Fixed-Share Forward Contract at any desired annual rate (Depending on terms of particular PLACES issuance, Company may not be required to pay contract fees on the Fixed-Share Forward Contract). Company may have the right to defer payment of contract fees on the Fixed-Share Forward Contract until maturity of that contract.

Resettable Remarketable Debt
- The Resettable Remarketable Debt may be issued by Company with any desired principal amount (e.g., $25) and may have a maturity of 5 years. Company may make interest payments (e.g., on a quarterly basis) at any desired annual rate on the principal amount (see note 5, below). After year 2½, the interest rate on the Debt may be reset and the Debt may be remarketed (see "Mechanics of Reset and Remarketing" below) (see also note 6, below)
- In the event of a failed remarketing, the Debt may be puttable by investors at face value.
- Mechanics of Reset and Remarketing: At year 2½, each holder of the Debt (whether the Debt is held separately or as part of the PACES) may determine whether it intends to participate in the remarketing (see note 6, below) If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the interest payment (e.g., quarterly) on the Debt such holder(s) would otherwise be entitled to if the Debt were not reset and remarketed; and (iii) any accrued and unpaid interest on the Debt. Holder(s) who elect not to participate in the remarketing may be required to deliver specified U.S. Treasury Securities to the Forward Contract Agent on the designated date prior to the remarketing.
- Transferability of the Debt: Subject to the requirement to post substitute collateral (see "Substitution of Pledged Securities" below), the Debt may be freely transferable.

Variable-Share Forward Contract
- Pre-paid and irrevocable contract between Company and investor(s) specifying the future receipt by Company of a variable number of shares of its common stock in 3 years. The number of shares deliverable by investor(s) to Company (the "Settlement Rate") may be determined, for example, by the average trading price of the common stock over a 20-day period ending on the third date prior to the maturity date as summarized in Table 3, below:

TABLE 3

| Stock Price | # of Shares |
| --- | --- |
| Stock Price ≦ Reference Price | 0 shares |
| Reference Price < Stock Price < Threshold Price (e.g., $30 (see note 7, below)) | # of shares = (PLACES issue price/Reference Price) * [1-(Reference Price /Stock Price)] |
| Stock Price ≧ Threshold Price | # of shares = (PLACES issue price/Reference Price) * [1-(Reference Price/Threshold Price)] (e.g., 0.1667 shares) |

[note that "Reference Price" may be stock price at issuance and "Threshold Price" may be a conversion price]

- Prior to maturity, Company may, at its option, fix the Settlement Rate based on a pre-specified formula that is a function of: (i) the average trading price of the common stock over the 20-day period commencing on the day following Company's election; and (ii) the Variable-Share Forward Contract's remaining maturity.
- The Variable-Share Forward Contract may automatically terminate in the event of Company bankruptcy or if, in the event of a failed remarketing, Company fails to pay put proceeds to investor(s) who exercise their put rights on the Resettable Remarketable Debt (see below).
- Contract Fees on Variable-Share Forward: Company may pay contract fees (e.g., quarterly) on the Variable-Share Forward Contract at any desired annual rate. Company may have the right to defer payment of contract fees on the Variable-Share Forward Contract until maturity of that contract.
- Right to Defer Contract Fees: Company may have the option (e.g., upon prior written notice to investor(s)) to defer the payment of any contract fees on the Fixed-Share Forward Contract and the Variable-Share Forward Contract until the respective maturities of those contracts. Deferred contract fees may bear additional contract fees at any desired rate per year. If the Fixed-Share Forward Contract or Variable-Share Forward Contract is terminated prior to its maturity (for example, in the case of bankruptcy prior to maturity), investors' right to receive contract fees and any deferred contract fees may also terminate. If Company elects to defer the payment of Contract Fees until maturity of the Fixed-Share Forward Contract or Variable-Share Forward Contract, as the case may be, in lieu of cash, investor(s) may receive Company common stock worth the amount of deferred contract fees, based on the then stock price; provided, however, that Company may not be required to deliver to investor(s) more than a certain number of shares of common stock as payment of the deferred contract fees.

Substitution of Pledged Securities

The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal to the principal amount of the Debt. Upon the substitution of such collateral, the Debt may be released to the holder, creating "Stripped PACES."

A specified portion of the PACES (e.g., 0.1667 PACES) may initially be pledged as collateral to secure investors' obligations to deliver stock under the Variable-Share Forward Contract. Upon settlement of the Fixed-Share Forward Contract at year 2¾, the common stock issued with respect to the PACES pledged as collateral may be retained by the collateral agent to secure investors' obligations to deliver stock to Company at year 3. However, each holder may have the right to substitute for the PACES (or, in another example, Stripped PACES) held by the collateral agent the same number of shares of Company common stock. (The number of shares which must be pledged as collateral may equal the maximum number of shares deliverable under the Variable-Share Forward Contract.) Upon the substitution of such collateral, the PACES (or Stripped PACES) may be released to the holder, creating "Stripped Forwards."

Listing of Stripped PACES and Stripped Forwards: If PACES, Stripped PACES, Debt, or Stripped Forwards are separately traded to a sufficient extent that applicable exchange listing requirements are met, Company may endeavor to cause such securities to be listed on the exchange on which the PLACES are then listed.

Recreating PACES and the Variable-Share Forward

Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.

A holder of Stripped Forwards may have the right to subsequently recreate Variable-Share Forward Contracts by delivering Stripped Forwards and the requisite amount of PACES in exchange for Variable-Share Forwards and the release of the common stock previously pledged as collateral.

Bankruptcy or Default: In case of bankruptcy prior to maturity, both the Fixed-Share Forward Contract and the Variable-Share Forward Contract may automatically terminate. If, in the event of a failed remarketing, investor(s) exercise the put right on the Debt but Company fails to satisfy its obligations under that put, the Variable-Share Forward Contract may terminate. In that case, the maturity of the Fixed-Share Forward Contract may be extended to the Extension Date, which (in one example) may be six days after the original maturity date. Investor(s) may elect to settle the Fixed-Share Forward Contract prior to the Extension Date. If investor(s) have not settled the Fixed-Share Forward Contract prior to the Extension Date, the Fixed-Share Forward Contract may automatically terminate.

Treasury/Agency-Collateralized PLACES

In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.

Holder(s) of PACES may receive the yield on the Treasury Securities (or US Government Agency Securities) in addition to contract fees, if any, that Company pays on the Fixed-Share Forward Contract.

Notes on the PLACES example described above:
1) Maturity could be longer (or shorter), for example up to 4¾ years in the case of the Fixed-Share Forward Contract and 5 years in the case of the Variable-Share Forward Contract. If the maturities of the Fixed-Share Forward Contract and Variable-Share Forward Contract were extended, for example, the maturity of the Debt would correspondingly be extended as well (e.g., the Debt maturity would be 7 years (for example) if the Fixed-Share Forward Contract was structured to have a maturity of 4¾ years).
2) Alternatively, Debt may be floating-rate debt.
3) Date of rate reset and remarketing may be adjusted if the Fixed-Share Forward Contract were structured to have a longer (or shorter) maturity.
4) Number of shares underlying the Fixed-Share Forward Contract=PLACES Issue Price/Reference Price.
5) Debt may be either fixed-rate or floating-rate debt.
6) Date of rate reset and remarketing may be adjusted if the Fixed-Share Forward Contract (and the Debt) were structured to have a longer (or shorter) maturity.
7) This example assumes Threshold Price is 20% above Reference Price, but premium of Threshold Price to Reference Price could be higher or lower.

In another embodiment, a net accretion may result from a purchased variable share repurchase contract (e.g., for a low P/E issuer).

In another embodiment, one or more instruments (e.g., debt, forward contract) may be sold as a unit.

In additional embodiments: (a) the PACES may be stripped (e.g., by an investor) into components and formed to trade separately; (b) the PLACES may be formed of PACES plus a call option purchased by the issuer (which call option may be structured as a pre-paid variable-share forward); (c) the PLACES may be backed by one or more assets; and/or (d) the COMMON PLACES may be formed of common stock (or any equity) plus a call option purchased by the issuer (which call option may be structured as a pre-paid variable-share forward).

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the various steps may be performed in any desired order. Further still, the invention may be used in the context of one or more issuers and/or one or more investors. Further still, the first entity may comprise one or more issuing companies and the second entity may comprise one or more investors.

What is claimed is:

1. A method implemented by a computer system comprising:
   inputting data via a computer system regarding a sale, by a company to an other entity, of a security consisting of: (i) a post-paid forward contract which obligates the other entity to purchase a fixed number of shares stock of the company; and (ii) debt;
   inputting data via the computer system regarding a purchase, by the company from the other entity, of a pre-paid forward contract which obligates the other entity to deliver to the company a variable number of shares of stock in the company;
   inputting via the computer system a then-current stock price associated with the stock of the company;
   calculating via the computer system a number of shares underlying the pre-paid forward contract, based on a formula that is a function of a then-current stock price and a remaining maturity associated with the pre-paid forward contract wherein the formula is pre-specified;
   recording via the computer system the data regarding the sale, by the company to the other entity, of the security consisting of: (i) the post-paid forward contract; and (ii) the debt;
   recording via the computer system the data regarding the purchase, by the company from the other entity, of the pre-paid forward contract; and
   recording via the computer system the calculated number of shares underlying the pre-paid forward contract;
   wherein the pre-paid forward contract comprises a call option.

2. The method of claim 1, wherein the stock of the company is common stock in a public company.

3. The method of claim 1, wherein the post-paid forward contract obligates the company to sell and the other entity to purchase, at maturity of the post-paid forward contract, a fixed number of shares of stock in the company for a fixed price.

4. The method of claim 3, wherein the fixed price equals a face amount of the debt.

5. The method of claim 1, wherein the company pays, to the other entity, a contract fee on the post-paid forward contract.

6. The method of claim 5, wherein the contract fee is paid once.

7. The method of claim 5, wherein the contract fee is paid periodically at a time selected from the group including: (a) daily; (b) weekly; (c) monthly; (d) quarterly; (e) semi-annually; and (f) annually.

8. The method of claim 1, wherein the debt is initially pledged as collateral to secure the obligations of the other entity under the post-paid forward contract.

9. The method of claim 8, wherein the other entity has the right to recollateralize the post-paid forward contract.

10. The method of claim 1, wherein the debt pays a fixed cash coupon, subject to reset.

11. The method of claim 10, wherein the coupon is paid periodically at a time selected from the group including: (a) daily; (b) weekly; (c) monthly; (d) quarterly; (e) semi-annually; and (f) annually.

12. The method of claim 11, wherein the coupon is reset and the debt is remarketed.

13. The method of claim 1, wherein the pre-paid forward contract obligates the other entity to deliver to the company a variable number of shares of stock in the company depending on a price of the stock at maturity of the pre-paid forward contract.

14. The method of claim 13, wherein the company pre-pays the purchase price of the stock and need not pay for the stock at the time of delivery.

15. The method of claim 14, wherein at least a portion of the purchase price of the stock is paid to the other entity at the time of issuance of the pre-paid forward contract with the remaining portion funded through periodic contract payments.

16. The method of claim 15, wherein the contract payments are paid periodically at a time selected from the group including: (a) daily; (b) weekly; (c) monthly; (d) quarterly; (e) semi-annually; and (f) annually.

17. The method of claim 1, wherein, prior to maturity of the pre-paid forward contract, the company has the right to fix the number of shares underlying the pre-paid forward contract, based on a formula that is a function of a then-current stock price and a remaining maturity associated with the pre-paid forward contract.

18. The method of claim 1, wherein the post-paid forward contract and the debt are initially pledged as collateral to secure the obligations of the other entity to deliver stock pursuant to the pre-paid forward contract.

19. The method of claim 18, wherein the other entity has the right to recollateralize the pre-paid forward contract with common stock of the first company.

* * * * *